United States Patent
Mikamo et al.

(10) Patent No.: US 9,771,098 B2
(45) Date of Patent: Sep. 26, 2017

(54) MOTOR CONTROL DEVICE AND ELECTRIC POWER STEERING DEVICE

(71) Applicant: JTEKT CORPORATION, Osaka-shi, Osaka (JP)

(72) Inventors: Satoru Mikamo, Okazaki (JP); Ayumi Koike, Takahama (JP)

(73) Assignee: JTEKT CORPORATION, Osaka (JP)

( * ) Notice: Subject to any disclaimer, the term of this patent is extended or adjusted under 35 U.S.C. 154(b) by 78 days.

(21) Appl. No.: 14/633,971

(22) Filed: Feb. 27, 2015

(65) Prior Publication Data
US 2015/0251692 A1  Sep. 10, 2015

(30) Foreign Application Priority Data

Mar. 7, 2014  (JP) .................................. 2014-045228

(51) Int. Cl.
*B62D 5/04* (2006.01)
*H02P 21/00* (2016.01)
(Continued)

(52) U.S. Cl.
CPC .......... *B62D 5/0472* (2013.01); *B60L 15/025* (2013.01); *B60L 15/20* (2013.01);
(Continued)

(58) Field of Classification Search
CPC .... B62D 5/046; B62D 5/0463; B62D 5/0484; B62D 5/049; B62D 6/003; B62D 6/008;
(Continued)

(56) References Cited

U.S. PATENT DOCUMENTS

| | | | |
|---|---|---|---|
| 7,126,304 B2 * | 10/2006 | Suzuki ................... | B62D 5/046 318/400.04 |
| 2007/0176575 A1 * | 8/2007 | Nawa ................. | H02M 7/53875 318/800 |
| 2014/0156144 A1 | 6/2014 | Hoshi et al. | |

FOREIGN PATENT DOCUMENTS

| | | | |
|---|---|---|---|
| JP | 2003-033043 A | | 1/2003 |
| JP | 2006-042480 A | | 2/2006 |

(Continued)

OTHER PUBLICATIONS

Sep. 14, 2015 Extended Search Report issued in European Patent Application No. 15 15 7524.8.

*Primary Examiner* — Jerrah Edwards
*Assistant Examiner* — Charles J Han
(74) *Attorney, Agent, or Firm* — Oliff PLC

(57) ABSTRACT

A motor control device includes a motor drive circuit and a microcomputer that controls the drive circuit. The microcomputer generates a control signal on the basis of duty command values Du, Dv, and Dw to control the drive circuit. The microcomputer includes a dead time compensation section that corrects the duty command values Du, Dv, and Dw on the basis of dead time compensation values Ddu, Ddv, and Ddw. The dead time compensation section includes a basic compensation value computation section that computes a basic compensation value Dd as a fundamental value of the dead time compensation values Ddu, Ddv, and Ddw, and a filter section that performs a filtering process corresponding to a low-pass filter on the basic compensation value Dd. The dead time compensation section sets the dead time compensation values Ddu, Ddv, and Ddw on the basis of an output value α from the filter section.

3 Claims, 11 Drawing Sheets

(51) Int. Cl.
*H02P 27/04* (2016.01)
*B62D 6/00* (2006.01)
*H02P 27/08* (2006.01)
*B60L 15/02* (2006.01)
*B60L 15/20* (2006.01)
*B60W 10/00* (2006.01)
*H02M 1/38* (2007.01)

(52) U.S. Cl.
CPC .............. *B60W 10/00* (2013.01); *B62D 5/046* (2013.01); *H02P 21/00* (2013.01); *H02P 21/50* (2016.02); *H02P 27/08* (2013.01); *B60L 2240/12* (2013.01); *B60L 2240/423* (2013.01); *B60L 2240/427* (2013.01); *B60L 2240/429* (2013.01); *B60L 2240/80* (2013.01); *B60L 2270/142* (2013.01); *B60L 2270/145* (2013.01); *H02M 2001/385* (2013.01); *Y02T 10/643* (2013.01); *Y02T 10/72* (2013.01); *Y02T 10/7275* (2013.01)

(58) Field of Classification Search
CPC .......... B62D 7/159; H02M 2001/0009; H02M 7/5395; H02P 21/0035; H02P 6/08
See application file for complete search history.

(56) References Cited

FOREIGN PATENT DOCUMENTS

| JP | 2006-320122 A | | 11/2006 |
| JP | 2009-011017 A | | 1/2009 |
| JP | 2012-249424 A | | 12/2012 |
| JP | 2012249424 A | * | 12/2012 |
| JP | 2013-215064 A | | 10/2013 |
| JP | 2013215064 A | * | 10/2013 |

* cited by examiner

MOTOR CONTROL DEVICE AND ELECTRIC POWER STEERING DEVICE

INCORPORATION BY REFERENCE

The disclosure of Japanese Patent Application No. 2014-045228 filed on Mar. 7, 2014 including the specification, drawings and abstract, is incorporated herein by reference in its entirety.

BACKGROUND OF THE INVENTION

1. Field of the Invention

The present invention relates to a motor control device and an electric power steering device.

2. Description of Related Art

A motor control device used in an electric power steering device or the like includes a drive circuit that drives a motor and a microcomputer that controls drive of the motor via the drive circuit. A drive circuit that drives a three-phase motor is composed of an inverter circuit, for example, and constituted by connecting three arms corresponding to the respective phases of the motor in parallel with each other, the arms each being a basic unit composed of a pair of switching elements connected in series with each other. In the motor control device, a current supplied to the motor is detected by a current sensor, and current feedback control in which the current value detected by the current sensor is caused to follow a current command value is executed to compute a voltage command value. The current command value and the voltage command value correspond to a target value of a current and a target value of a voltage, which are supplied to the motor, respectively. The motor control device generates a duty command value corresponding to the voltage command value. The duty command value is a parameter that determines the periods for turning on and off the switching elements of each arm. The motor control device generates a control signal on the basis of the duty command value, and outputs the control signal to each arm of the drive circuit to alternately turn on and off a switching element on the higher potential side and a switching element on the lower potential side of each arm at predetermined timings. Consequently, three-phase drive electric power matching the current command value is supplied to the motor to drive the motor.

In such a motor control device, a dead time in which both the switching elements on the higher potential side and the lower potential side of each arm are turned off when switching between on and off is normally provided in order to prevent an arm short circuit between the switching elements. However, the presence of the dead time causes an error between the actual voltage supplied to the motor and a voltage command value, which may cause a distortion in current supplied to the motor. This may cause the motor to generate torque ripple, vibration, and abnormal sound.

Japanese Patent Application Publication No. 2006-320122 (JP 2006-320122 A) describes a motor control device that computes a dead time compensation value on the basis of a current command value and corrects a duty command value on the basis of the computed dead time compensation value to reduce an error between the actual voltage supplied to the motor and a voltage command value.

With the motor control device described in JP 2006-320122 A, fluctuations in current command value causes fluctuations in dead time compensation value, which incurs fluctuations in output torque from the motor, that is, torque ripple. This may cause generation of abnormal sound from the motor.

SUMMARY OF THE INVENTION

An object of the present invention is to provide a motor control device and an electric power steering device, which are capable of reducing abnormal sound from a motor due to dead time compensation.

An aspect of the present invention provides a motor control device including: a drive circuit that supplies drive electric power to a motor; a current sensor that detects a current value to be supplied to the motor; and a control section that computes a voltage command value through execution of current feedback control in which the current value detected by the current sensor is caused to follow a current command value, and generates a control signal on the basis of a duty command value corresponding to the voltage command value to control drive of the drive circuit on the basis of the control signal, in which: the control section includes a dead time compensation section that corrects the duty command value on the basis of a dead time compensation value; the dead time compensation section includes a basic compensation value computation section that computes a basic compensation value, which is a fundamental value of the dead time compensation value, on the basis of the current command value, and a filter section that performs a filtering process corresponding to a low-pass filter on the basic compensation value; and the dead time compensation section is configured to set the dead time compensation value on the basis of an output value from the filter section.

According to the configuration, fluctuations in output value in a frequency band higher than a predetermined frequency band can be suppressed by a filtering process corresponding to a low-pass filter performed by the filter section on the basic compensation value even in the case where there are fluctuations in basic compensation value due to fluctuations in current command value. Thus, unnecessary vibration of the dead time compensation value can be suppressed by setting the dead time compensation value on the basis of the output value from the filter section. As a result, fluctuations in duty command value that may cause the motor to generate torque ripple can be suppressed. Thus, abnormal sound from the motor can be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A motor control device according to an embodiment will be described below. First, an overview of an electric power steering device on which the motor control device according to the embodiment is mounted will be described.

Figure 1:
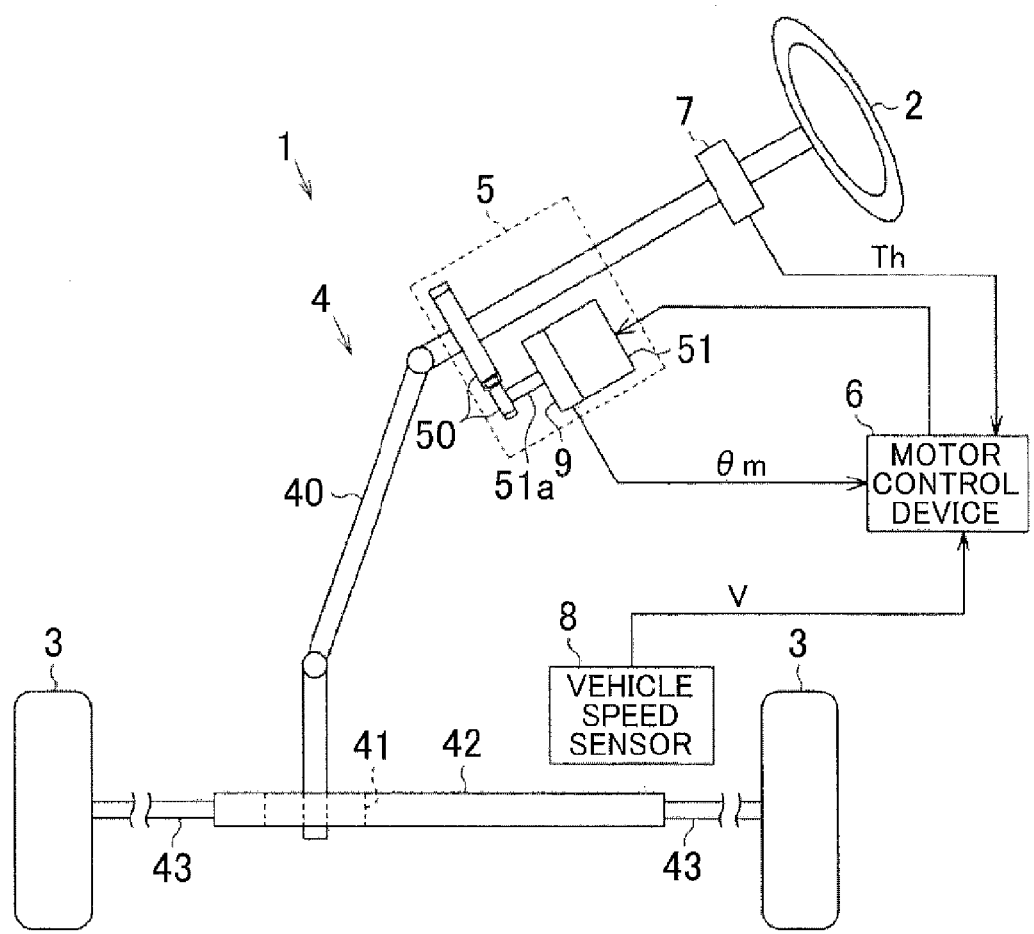
FIG. 1 is a block diagram illustrating a schematic configuration of an electric power steering device according to an embodiment.

As illustrated in FIG. 1, an electric power steering device 1 includes a steering mechanism 4 that steers steered wheels 3 on the basis of an operation of a steering wheel 2 performed by a driver, and an assist mechanism 5 that assists the driver in performing a steering operation.

The steering mechanism 4 includes a steering shaft 40 coupled to the steering wheel 2, and a rack shaft 42 coupled to the lower end portion of the steering shaft 40 via a rack-and-pinion mechanism 41. With the steering mechanism 4, when the steering shaft 40 is rotated along with an operation of the steering wheel 2 performed by the driver, rotational motion of the steering shaft 40 is converted into reciprocal linear motion of the rack shaft 42 in the axial direction via the rack-and-pinion mechanism 41. Reciprocal linear motion of the rack shaft 42 in the axial direction is transferred to the steered wheels 3 via tie rods 43 coupled to both ends of the rack shaft 42 to vary the steering angle of the steered wheels 3 to change the advancing direction of the vehicle.

The assist mechanism 5 includes a motor 51 coupled to the steering shaft 40 via a speed reducer 50. The motor 51 is a brushless motor. The assist mechanism 5 transfers rotation of an output shaft 51a of the motor 51 to the steering shaft 40 via the speed reducer 50 to apply torque to the steering shaft 40 to assist the driver in performing a steering operation.

The electric power steering device 1 is provided with various sensors that detect the operation amount of the steering wheel 2 and a vehicle state amount. For example, the steering shaft 40 is provided with a torque sensor 7 that detects steering torque Th applied to the steering shaft 40 when the driver performs a steering operation. The vehicle is provided with a vehicle speed sensor 8 that detects a travel speed V. The motor 51 is provided with a rotational angle sensor 9 that detects a rotational angle θm of the output shaft 51a. Output signals from the sensors 7 to 9 are input to a motor control device 6. The motor control device 6 controls drive of the motor 51 on the basis of the output signals from the sensors 7 to 9.

Figure 2:
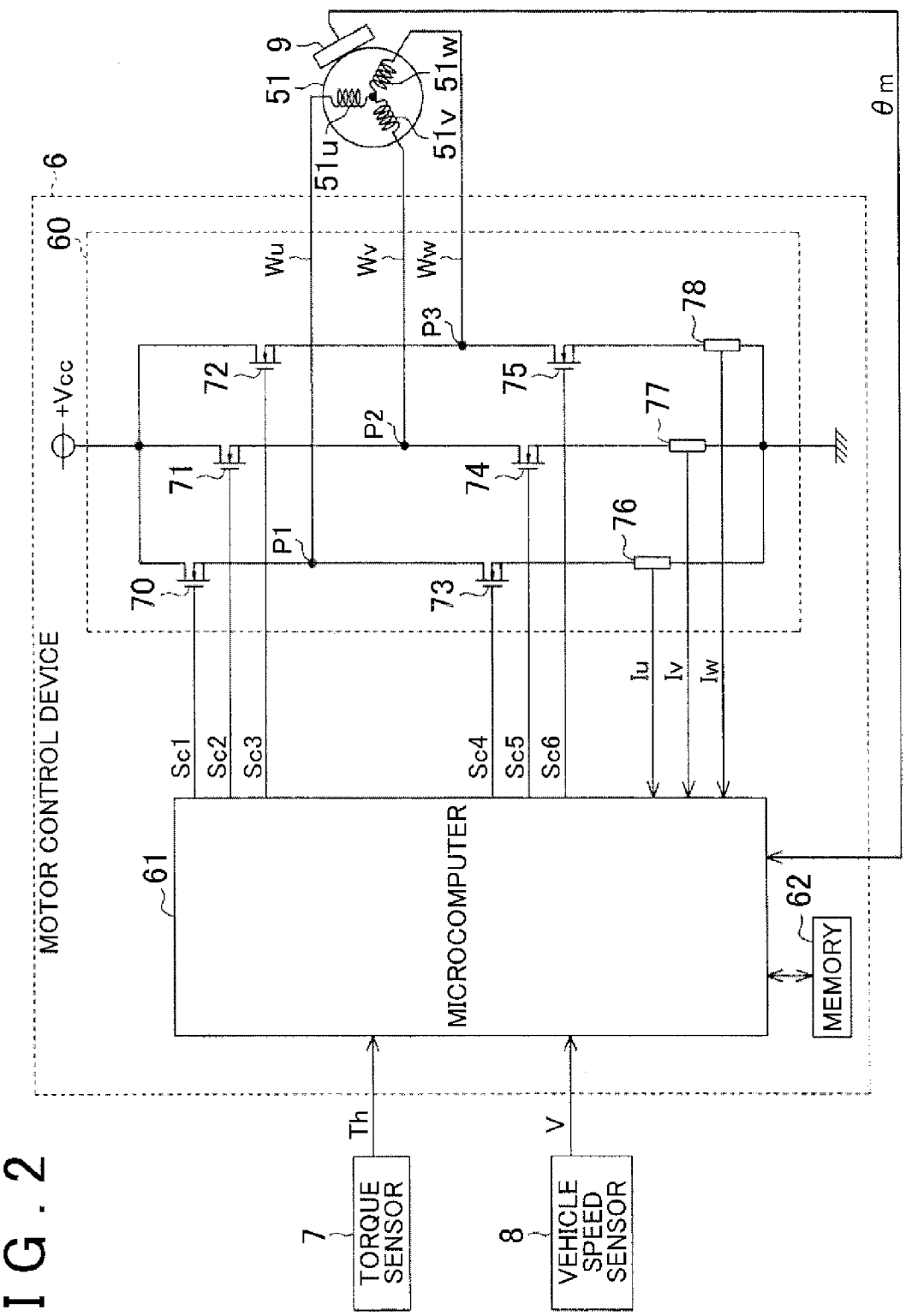
FIG. 2 is a block diagram illustrating the configuration of a motor control device of the electric power steering device according to the embodiment.

As illustrated in FIG. 2, the motor control device 6 includes a drive circuit 60 that drives the motor 51, a microcomputer 61 that serves as a control section that controls drive of the motor 51 via the drive circuit 60, and a memory 62 that stores various information.

The drive circuit 60 is composed of a known inverter circuit in which a series circuit of an upper FET 70 and a lower FET 73, a series circuit of an upper FET 71 and a lower FET 74, and a series circuit of an upper FET 72 and a lower FET 75 are connected in parallel with each other. The upper FETs 70 to 72 are electrically connected to a power source (with a power source voltage of +Vcc) such as an in-vehicle battery. Meanwhile, the lower FETs 73 to 75 are grounded. A connection point P1 between the upper FET 70 and the lower FET 73, a connection point P2 between the upper FET 71 and the lower FET 74, and a connection point P3 between the upper FET 72 and the lower FET 75 are connected to coils 51u, 51v, and 51w of the motor 51 for the phases via power supply lines Wu, Wv, and Ww, respectively. The drive circuit 60 generates drive electric power, which is three-phase (U-phase, V-phase, and W-phase) AC electric power, from DC electric power supplied from the power source with the FETs 70 to 75 switched on the basis of control signals Sc1 to Sc6 output from the microcomputer 61. The generated three-phase drive electric power is supplied to the coils 51u, 51v, and 51w of the motor 51 for the respective phases via the power supply lines Wu, Wv, and Ww for the respective phases.

Current sensors 76 to 78 corresponding to the respective phases are provided between the lower FETs 73 to 75 and the ground. The current sensors 76 to 78 detect current values Iu, Iv, and Iw for the respective phases to be supplied to the motor 51. Output signals from the current sensors 76 to 78 are input to the microcomputer 61.

Besides the output signals from the current sensors 76 to 78, the output signals from the torque sensor 7, the vehicle speed sensor 8, and the rotational angle sensor 9 are also input to the microcomputer 61. The microcomputer 61 generates the control signals Sc1 to Sc6 on the basis of the steering torque Th, the vehicle speed V, the motor rotational angle θm, and the current values Iu, Iv, and Iw for the respective phases, which are detected by the sensors 7 to 9 and 76 to 78, respectively, and outputs the control signals Sc1 to Sc6 to the drive circuit 60 to drive the drive circuit 60 through pulse width modulation (PWM).

Drive control for the drive circuit 60 performed by the microcomputer 61 will be discussed in detail.

Figure 3:
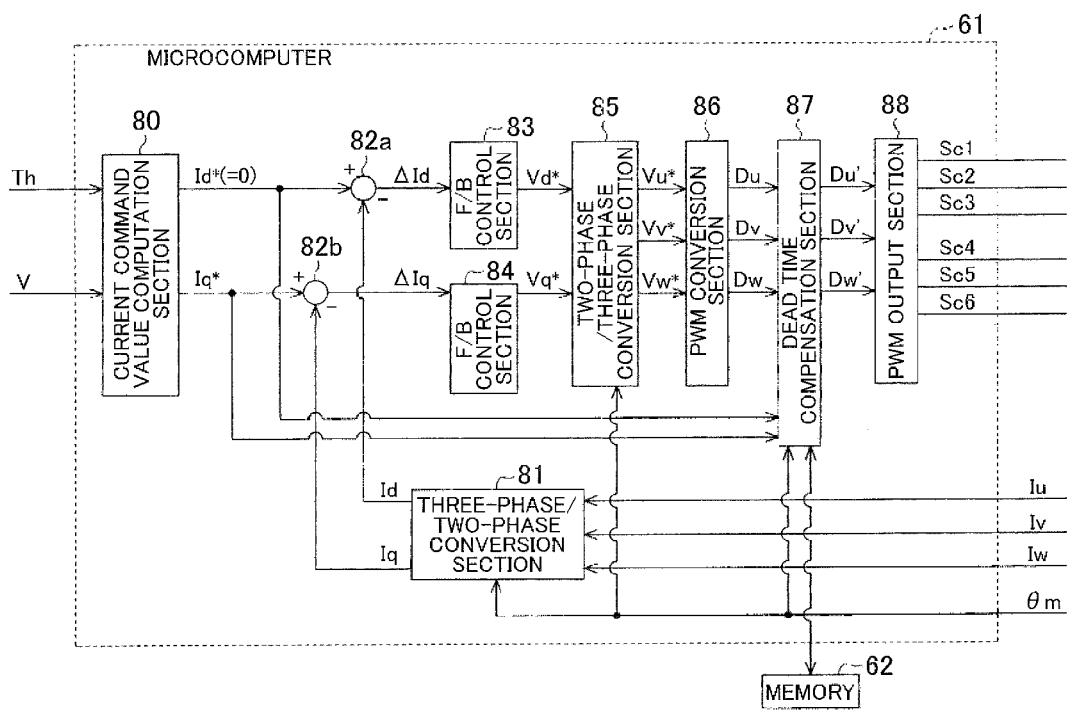
FIG. 3 is a block diagram illustrating the configuration of a microcomputer of the motor control device according to the embodiment.

As illustrated in FIG. 3, the microcomputer 61 includes a current command value computation section 80 and a three-phase/two-phase conversion section 81. The current command value computation section 80 computes a q-axis current command value Iq* on the basis of the steering torque Th and the vehicle speed V. The current command value computation section 80 sets the q-axis current command value Iq* to a larger value as the absolute value of the steering torque Th becomes larger or the vehicle speed V becomes lower, for example. The current command value computation section 80 outputs the computed q-axis current command value Iq* to a subtractor 82b. In the embodiment, a d-axis current command value Id* is set to zero, and the current command value computation section 80 outputs the d-axis current command value Id* to a subtractor 82a. The d-axis current command value Id* and the q-axis current command value Iq* correspond to target values for currents to be supplied to the motor 51 in a d/q coordinate system.

The three-phase/two-phase conversion section 81 computes a d-axis current value Id and a q-axis current value Iq by mapping the current values Iu, Iv, and Iw for the respective phases onto the d/q coordinate system using the motor rotational angle θm. The d-axis current value Id and the q-axis current value Iq are the actual current values of the motor 51 in the d/q coordinate system. The three-phase/two-phase conversion section 81 outputs the computed d-axis current value Id and q-axis current value Iq to the subtractors 82a and 82b, respectively.

The subtractor 82a calculates a d-axis current deviation ΔId by subtracting the d-axis current value Id from the d-axis current command value Id*, and outputs the calculated d-axis current deviation ΔId to a feedback (F/B) control section 83. The feedback control section 83 generates a d-axis voltage command value Vd* by executing current feedback control based on the d-axis current deviation ΔId such that the d-axis current value Id follows the d-axis current command value Id*, and outputs the generated d-axis voltage command value Vd* to a two-phase/three-phase conversion section 85. On the other hand, the subtractor 82b calculates a q-axis current deviation ΔIq by subtracting the q-axis current value Iq from the q-axis current command value Iq*, and outputs the calculated q-axis current deviation ΔIq to a feedback control section 84. The feedback control section 84 generates a q-axis voltage command value Vq* by executing current feedback control based on the q-axis current deviation ΔIq such that the q-axis current value Iq follows the q-axis current command value Iq*, and outputs the generated q-axis voltage command value Vq* to the two-phase/three-phase conversion section 85.

Figure 4:
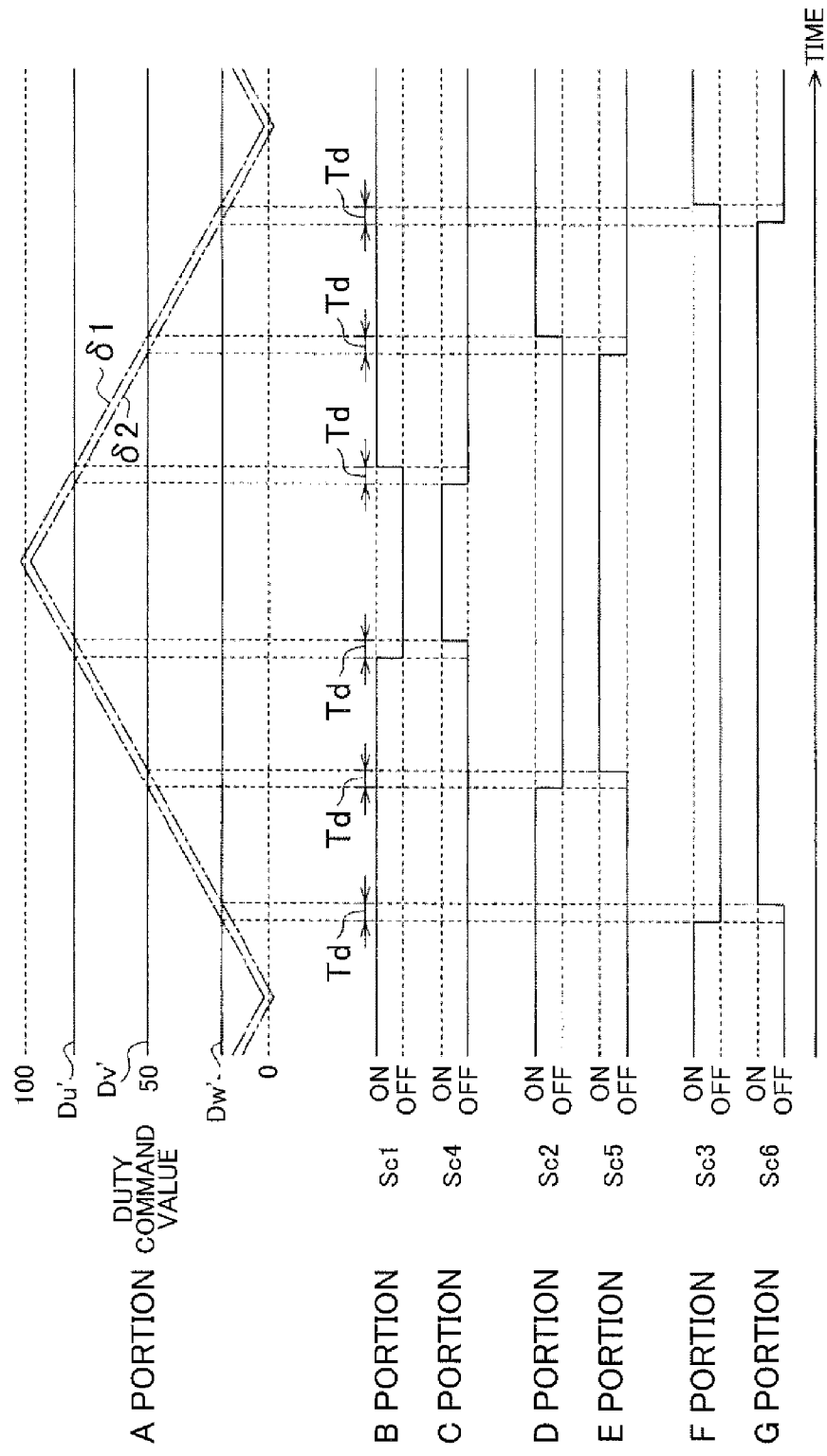
FIG. 4 is a time chart in which A to G portions indicate transition of duty command values Du', Dv', and Dw' and control signals Sc1 to Sc6, respectively.

The two-phase/three-phase conversion section 85 computes voltage command values Vu*, Vv*, and Vw* for the respective phases in a three-phase coordinate system by mapping the d-axis voltage command value Vd* and the q-axis voltage command value Vq* onto the three-phase coordinate system using the motor rotational angle θm, and outputs the computed voltage command values Vu*, Vv*, and Vw* for the respective phases to a PWM conversion section 86. The PWM conversion section 86 generates duty command values Du, Dv, and Dw for the respective phases corresponding to the voltage command values Vu*, Vv*, and Vw* for the respective phases, and outputs the generated duty command values Du, Dv, and Dw to a dead time compensation section 87. The dead time compensation section 87 corrects the duty command values Du, Dv, and Dw so as to compensate for a current distortion due to a dead time, and outputs the corrected duty command values Du', Dv', and Dw' to a PWM output section 88. The PWM output section 88 generates control signals Sc1 to Sc6 on the basis of a comparison between the duty command values Du', Dv', and Dw' and triangular waves δ1 and δ2, which are PWM carrier waves, as indicated by the A to G portions of FIG. 4, for example. In the embodiment, two triangular waves δ1 and δ2 (δ1>δ2) in the same phase as each other and shifted vertically are used to set a dead time for avoiding generation of a through current due to a so-called arm short circuit.

Particularly, in the case where the duty command values Du', Dv', and Dw' are larger than the value of the triangular wave δ1 located on the upper side, the PWM output section 88 generates control signals Sc1 to Sc3 that turn on the FETs 70 to 72 on the higher potential side (upper stage) corresponding to the relevant phase. In the case where the duty command values Du', Dv', and Dw' are smaller, the PWM output section 88 generates control signals Sc1 to Sc3 that turn off the FETs 70 to 72. Meanwhile, in the case where the duty command values Du', Dv', and Dw' are smaller than the value of the triangular wave δ2 located on the lower side, the PWM output section 88 generates control signals Sc4 to Sc6 that turn on the FETs 73 to 75 on the lower potential side (lower stage) corresponding to the relevant phase. In the case where the duty command values Du', Dv', and Dw' are larger, the PWM output section 88 generates control signals Sc4 to Sc6 that turn off the FETs 73 to 75. Consequently, a dead time Td during which both the upper FET and the lower FET for each phase are turned off is provided when the upper FET and the lower FET for each phase are switched between on and off.

As illustrated in FIG. 2, the microcomputer 61 drives the drive circuit 60 through PWM by outputting the thus generated control signals Sc1 to Sc6 to the FETs 70 to 75 of the drive circuit 60 to drive the motor 51. The motor 51 is thus driven to execute assist control for applying an assist force to the steering shaft 40.

The configuration of the dead time compensation section 87 according to the embodiment will be discussed in detail.

As illustrated in FIG. 3, the d-axis current command value Id*, the q-axis current command value Iq*, and the motor rotational angle θm are input to the dead time compensation section 87. The dead time compensation section 87 corrects the duty command values Du, Dv, and Dw on the basis of such values.

Figure 5:
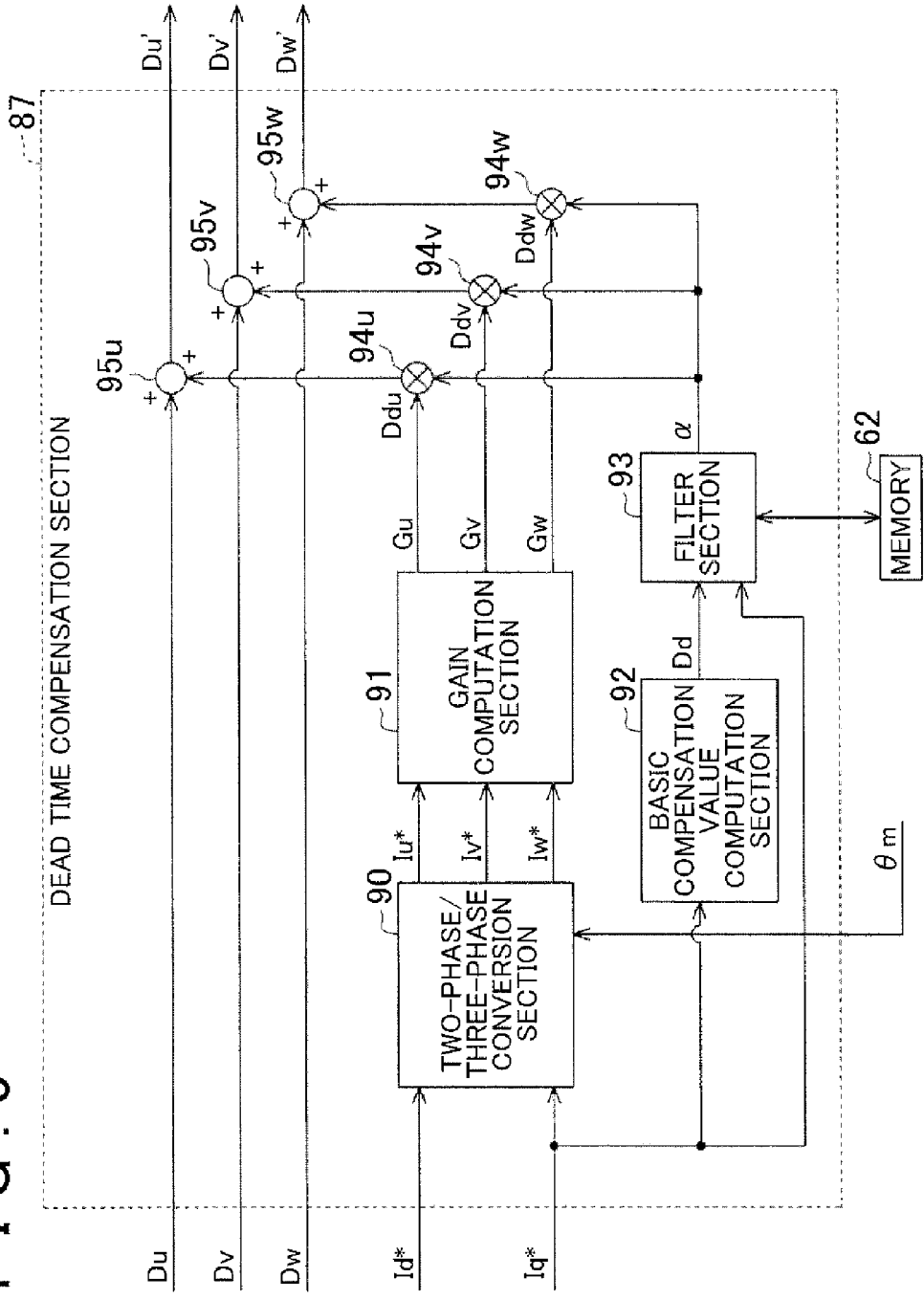
FIG. 5 is a block diagram illustrating the configuration of a dead time compensation section of the microcomputer according to the embodiment.

Particularly, as illustrated in FIG. 5, the dead time compensation section 87 includes a two-phase/three-phase conversion section 90, a gain computation section 91, a basic compensation value computation section 92, and a filter section 93.

The two-phase/three-phase conversion section 90 computes voltage command values Iu*, Iv*, and Iw* for the respective phases in a three-phase coordinate system by mapping the d-axis current command value Id* and the q-axis current command value Iq* onto the three-phase coordinate system using the motor rotational angle θm, and outputs the computed current command values Iu*, Iv*, and Iw* for the respective phases to the gain computation section 91. The gain computation section 91 computes gains Gu, Gv, and Gw for the respective phases on the basis of the current command values Iu*, Iv*, and Iw* for the respective phases. The gain computation section 91 has a map that indicates the relationship between the current command value In* and the gain Gn (n=u, v, w) illustrated in FIG. 6. In the map illustrated in FIG. 6, the sign of the gain Gn, whether positive or negative, is set to be the same as that of the current command value In*. In addition, the absolute value of the gain Gn is set to become larger as the absolute value of the current command value In* becomes larger, and the gain Gn is set to a constant value Ga (>0) in the case where the absolute value of the current command value In* is equal to or more than a threshold Ia (>0). The gain computation section 91 computes the gains Gu, Gv, and Gw on the basis of the map illustrated in FIG. 6, and outputs the computed gains Gu, Gv, and Gw to multipliers 94u, 94v, and 94w, respectively, as illustrated in FIG. 5.

The basic compensation value computation section 92 computes a basic compensation value Dd on the basis of the q-axis current command value Iq*. The basic compensation value Dd is a fundamental value of a dead time compensation value. The basic compensation value computation section 92 has a map indicating the relationship between the q-axis current command value Iq* and the basic compensation value Dd illustrated in FIG. 7. In the map illustrated in FIG. 7, the basic compensation value Dd is set to a value that is larger than zero, and set to become larger as the absolute value of the q-axis current command value Iq* becomes larger. In the case where the absolute value of the q-axis current command value Iq* is equal to or more than a threshold Iqa (>0), the basic compensation value Dd is set to a constant value Dda (>0). The basic compensation value computation section 92 computes the basic compensation value Dd on the basis of the map illustrated in FIG. 7, and outputs the computed basic compensation value Dd to the filter section 93 as illustrated in FIG. 5.

Figure 8:
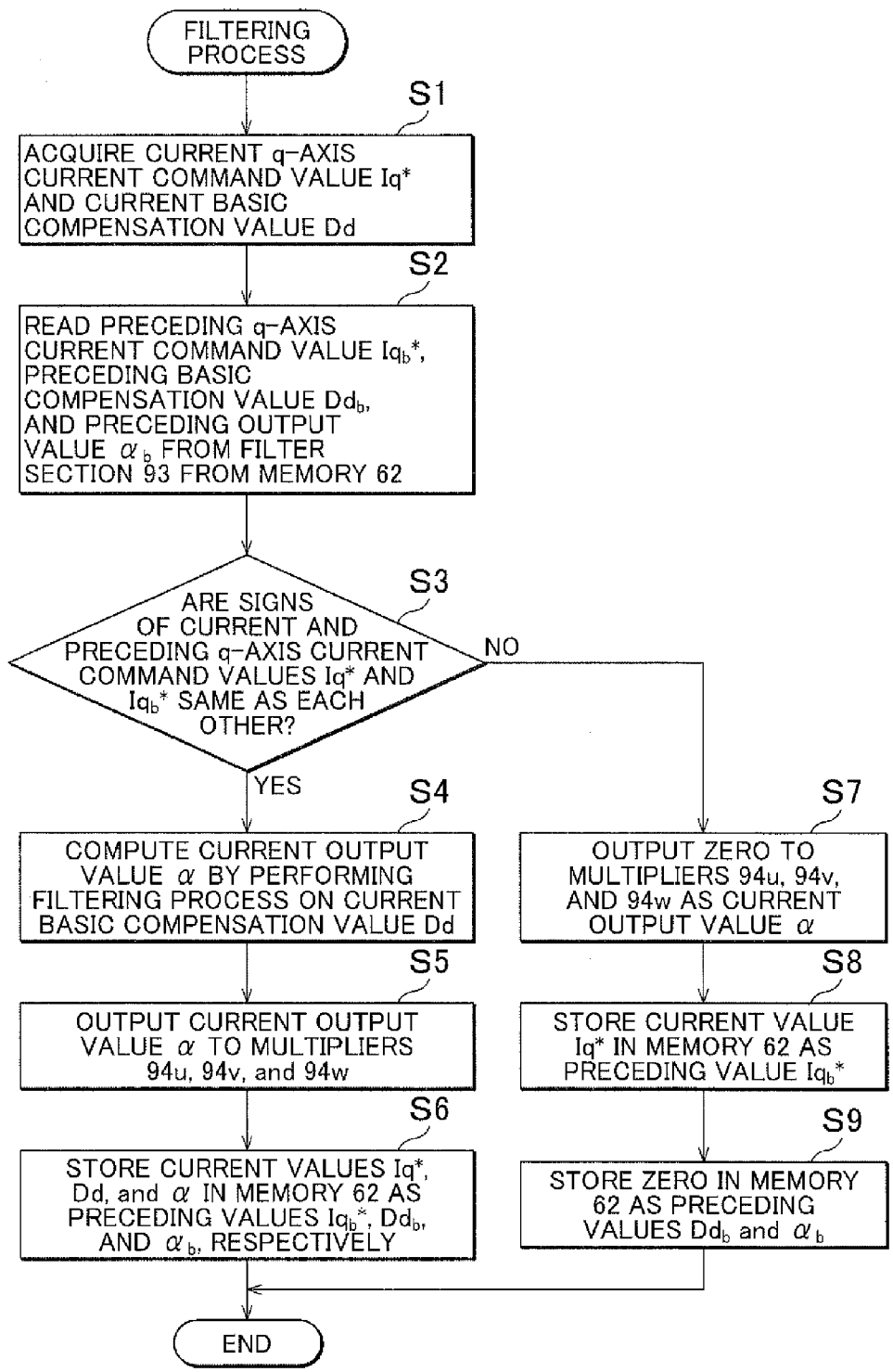
FIG. 8 is a flowchart illustrating procedures for a filtering process executed by a filter section of the dead time compensation section according to the embodiment.

The filter section 93 performs a filtering process based on a low-pass filter on the basic compensation value Dd. FIG. 8 illustrates procedures for the filtering process executed by the filter section 93. The filter section 93 repeatedly executes the process illustrated in FIG. 8 in predetermined computation cycles.

As illustrated in FIG. 8, the filter section 93 first acquires the current q-axis current command value Iq* from the current command value computation section 80, and acquires the current basic compensation value Dd from the basic compensation value computation section 92 (S1). In addition, the filter section 93 reads the preceding q-axis current command value $Iq_b$*, the preceding basic compensation value $Dd_b$, and the preceding output value $\alpha_b$ from the filter section 93 from the memory 62 (S2). Then, the filter section 93 determines whether or not the signs of the current and preceding q-axis current command values Iq* and $Iq_b$*, whether positive or negative, are the same as each other (S3). In the case where the signs of the current and preceding q-axis current command values Iq* and $Iq_b$*, whether positive or negative, are the same as each other (S3: YES), the filter section 93 computes the current output value α by performing a filtering process corresponding to a low-pass filter on the current basic compensation value Dd (S4). For example, the filter section 93 computes the current output value α from the current and preceding basic compensation values Dd and $Dd_b$ and the preceding output value $\alpha_b$ from the filter section 93 on the basis of the following formula (1). G0 indicates the gain of the filter section 93, or in other words the gain of the low-pass filter.

$$\alpha = Dd_b + G0 \times \{Dd - \alpha_b\} \quad (1)$$

The filter section 93 outputs the current output value α computed on the basis of the formula (1) to the multipliers 94u, 94v, and 94w (S5). Next, the filter section 93 stores the current q-axis current command value Iq*, the current basic compensation value Dd, and the current output value α from the filter section 93 in the memory 62 as the preceding values $Iq_b$*, $Dd_b$, and $\alpha_b$ (S6).

In the case where the signs of the current and preceding q-axis current command values Iq* and $Iq_b$*, whether positive or negative, are different from each other (S3: NO), that is, in the case where the sign of the q-axis current command value Iq* has been reversed, the filter section 93 outputs zero to the multipliers 94u, 94v, and 94w as the current output value α (S7). Next, the filter section 93 stores the current q-axis current command value Iq* in the memory 62 as the preceding q-axis current command value $Iq_b$* (S8). Further, the filter section 93 stores zero in the memory 62 as the preceding basic compensation value $Dd_b$ and the preceding output value $\alpha_b$ from the filter section 93 (S9).

As illustrated in FIG. 5, the multipliers 94u, 94v, and 94w compute dead time compensation values Ddu, Ddv, and Ddw for the respective phases by multiplying the output value α from the filter section 93 by the gains Gu, Gv, and Gw, respectively, and output the computed dead time compensation values Ddu, Ddv, and Ddw to adders 95u, 95v, and 95w, respectively. The adders 95u, 95v, and 95w compute the corrected duty command values Du', Dv', and Dw' by adding the dead time compensation values Ddu, Ddv, and Ddw to the duty command values Du, Dv, and Dw, respectively. The thus computed corrected duty command values Du', Dv', and Dw' are output from the dead time compensation section 87.

According to the configuration described above, the following effects and advantageous effects can be obtained. (チェックここまで)

Fluctuations in output value α in a frequency band higher than a predetermined frequency band can be suppressed by the effect of a low-pass filter achieved by the filter section 93 even in the case where there are fluctuations in basic compensation value Dd due to fluctuations in q-axis current command value Iq*. Thus, unnecessary vibration of the dead time compensation values Ddu, Ddv, and Ddw can be suppressed by setting the dead time compensation values Ddu, Ddv, and Ddw on the basis of the output value α from the filter section 93. As a result, fluctuations in duty command values Du', Dv', and Dw' that may cause the motor 51 to generate torque ripple can be suppressed to reduce abnormal sound from the motor 51.

Figure 7:
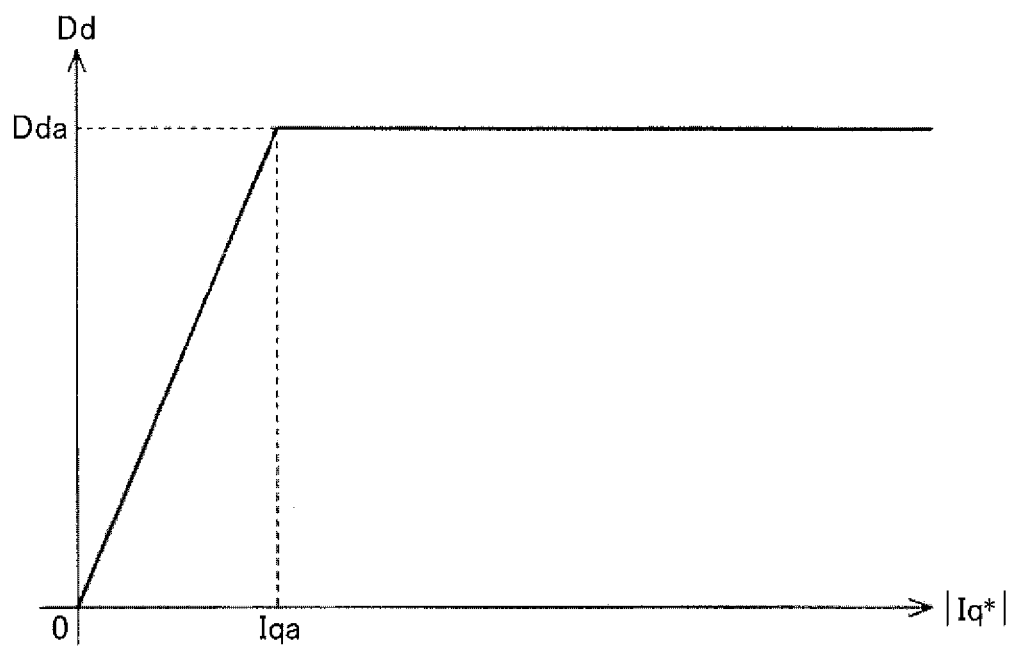
FIG. 7 is a graph illustrating the relationship between a q-axis current command value Iq* and a basic compensation value Dd.
Figure 9:
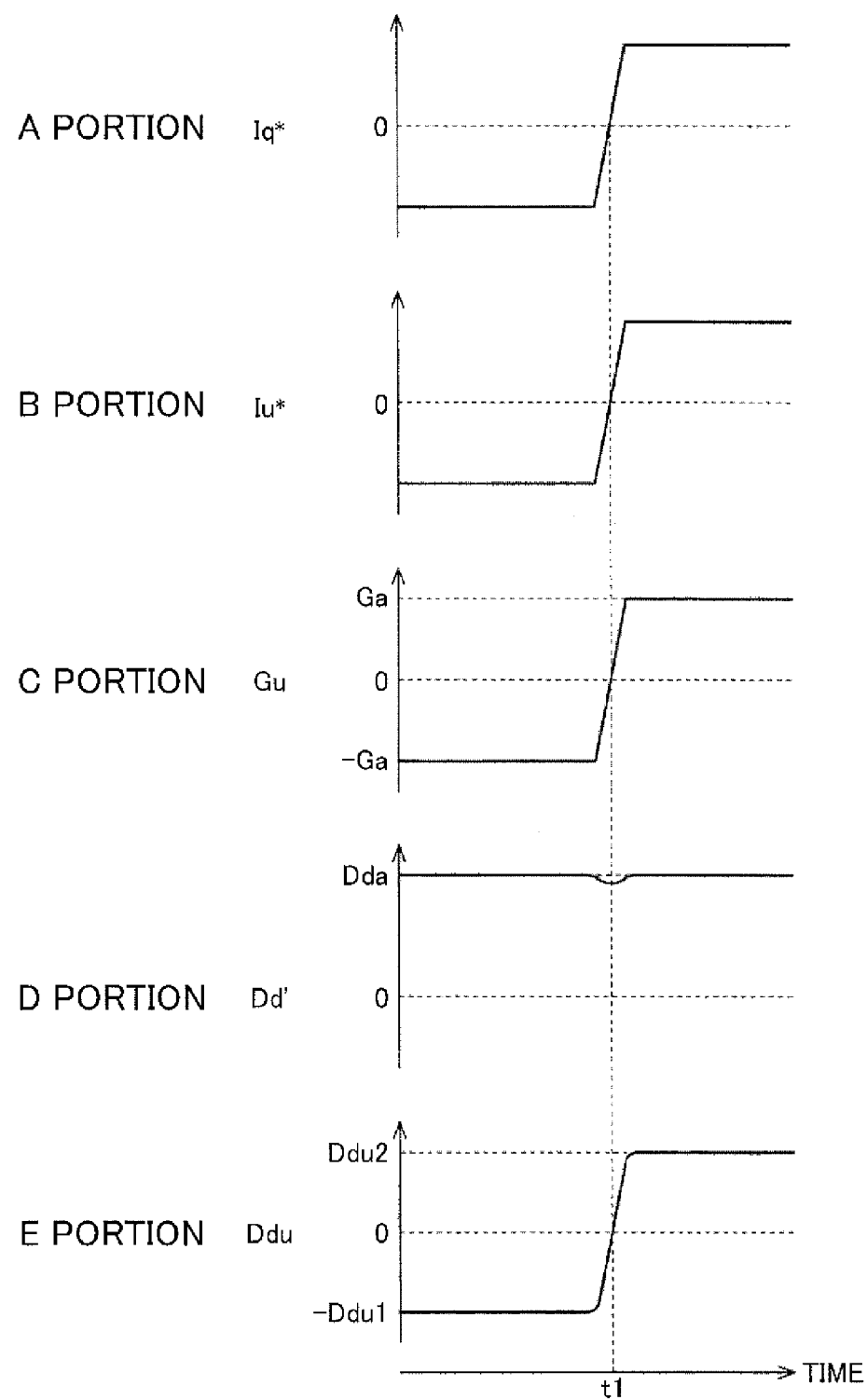
FIG. 9 is a time chart in which A to E portions indicate transition of a q-axis current command value Iq*, a U-phase current command value Iu*, a U-phase gain Gu, a basic compensation value Dd' after the filtering process, and a U-phase dead time compensation value Ddu, respectively, as a reference example.

When the rotational direction of the motor 51 is reversed, that is, when the sign of the q-axis current command value Iq* is reversed between positive and negative, the dead time compensation values Ddu, Ddv, and Ddw for the respective phases may be changed abruptly. Specifically, in the embodiment, the d-axis current command value Id* is set to zero, and therefore the signs of the current command values Iu*, Iv*, and Iw* for the respective phases computed by the two-phase/three-phase conversion section 90 are reversed between positive and negative if the sign of the q-axis current command value Iq* is reversed between positive and negative. For example, in the case where the U-phase current command value Iu* has a negative value at a time point before time t1 when the q-axis current command value Iq* is varied from a negative value to a positive value as illustrated in the A and B portions of FIG. 9, the U-phase current command value Iu* is varied from a negative value to a positive value along with reverse of the sign of the q-axis current command value Iq*. In such a case, as indicated by the C portion of FIG. 9, the gain Gu for the U phase computed by the gain computation section 91 is varied from a negative value −Ga to a positive value Ga. When the sign of the q-axis current command value Iq* is reversed between positive and negative, on the other hand, the basic compensation value Dd computed in accordance with the map illustrated in FIG. 7 is decreased from a positive value Dda to zero, and thereafter increased to the positive value Dda again. If a filtering process corresponding to a low-pass filter is performed on the thus varied basic compensation value Dd, the basic compensation value Dd' after the filtering process is smoothed as illustrated in the D portion of FIG. 9. In the case where the dead time compensation value Ddu for the U phase is calculated by multiplying the basic compensation value Dd' indicated by the D portion of FIG. 9 and the gain Gu for the U phase indicated by the C portion of FIG. 9, the dead time compensation value Ddu for the U phase is varied as indicated by the E portion of FIG. 9. That is, the dead time compensation value Ddu for the U phase is abruptly varied from a negative value −Ddu1 to a positive value Ddu2 at time t1 when the sign of the q-axis current command value Iq* is reversed between positive and negative. Likewise, the dead time compensation value Ddv for the V phase and the dead time compensation value Ddw for the W phase are also abruptly varied. Such abrupt variations in dead time compensation values Ddu, Ddv, and Ddw for the respective phases incur abrupt variations in duty command values Du', Dv', and Dw' for the respective phases, and therefore may cause generation of abnormal sound from the motor 51.

Figure 10:
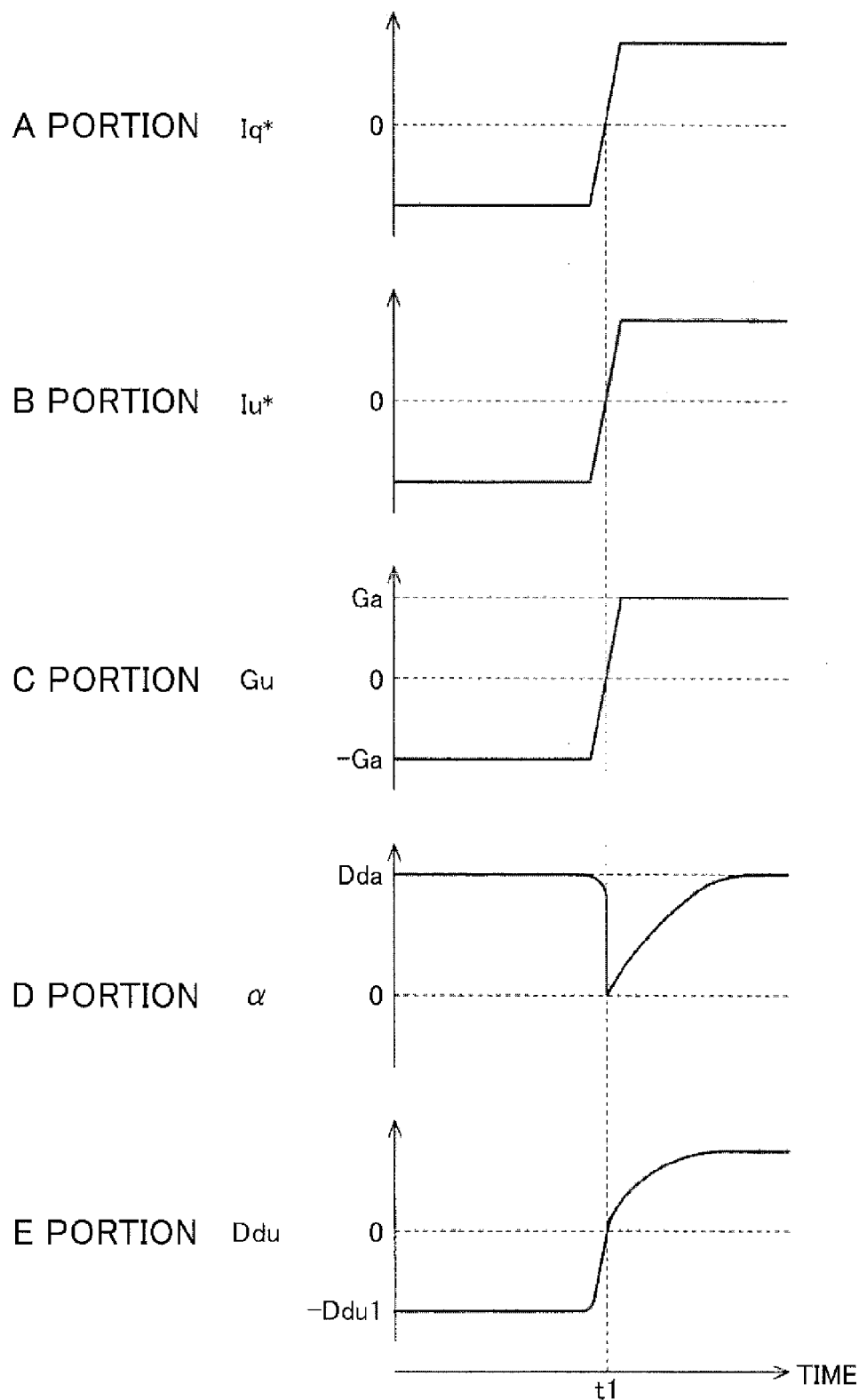
FIG. 10 is a time chart in which A to E portions indicate transition of a q-axis current command value Iq*, a U-phase current command value Iu*, a U-phase gain Gu, an output value α from the filter section, and a U-phase dead time compensation value Ddu, respectively, for the dead time compensation section according to the embodiment.

In this respect, the filter section 93 according to the embodiment outputs zero as the output value α when the sign of the q-axis current command value Iq* is reversed between positive and negative. Consequently, in the case where the q-axis current command value Iq* is varied as indicated by the A portion of FIG. 10, the output value α from the filter section 93 is set to zero when the sign of the q-axis current command value Iq* is varied from a negative value to a positive value as indicated by the D portion of FIG. 10. In addition, the filter section 93 subsequently resumes the filtering process from a state in which both the preceding output value $α_b$ and the preceding basic compensation value $Dd_b$ are set to zero, and therefore the output value α from the filter section 93 is gently varied from zero to the positive value Dda. At this time, in the case where the current command value Iu* for the U phase and the gain Gu for the U phase are varied as illustrated by the B and C portions of FIG. 10, the dead time compensation value Ddu for the U phase is varied as indicated by the E portion of FIG. 10. That is, the dead time compensation value Ddu for the U phase is varied from a negative value −Ddu1 to zero at time t1 when the sign of the q-axis current command value Iq* is reversed between positive and negative, and thereafter gently increased from zero to the positive value Ddu2. Therefore, the fluctuation width of the dead time compensation value Ddu for the U phase at time t1 is small compared to a case indicated by the E portion of FIG. 9, and thus abrupt variations in dead time compensation value Ddu for the U phase can be suppressed. Likewise, abrupt variations in the dead time compensation value Ddv for the V phase and the dead time compensation value Ddw for the W phase can also be suppressed. Consequently, abrupt variations in duty command values Du', Dv', and Dw' for the respective phases can be suppressed, and therefore abnormal sound from the motor can be reduced more adequately.

The embodiment described above may also be implemented in the following forms.

Figure 11:
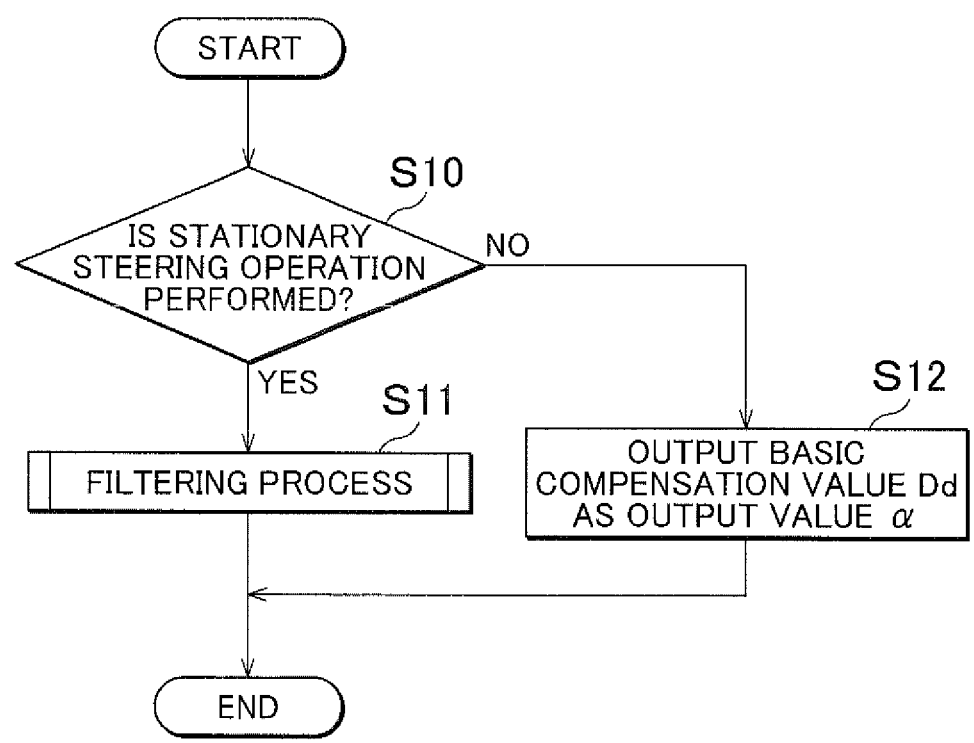
FIG. 11 is a flowchart illustrating procedures for a process executed by a filter section of a dead time compensation section of a motor control device according to a modification.

In the electric power steering device 1, abnormal sound from the motor 51 is problematic particularly during a steering operation with the vehicle stationary, that is, during a stationary steering operation. Thus, the filter section 93 may perform the filtering process illustrated in FIG. 8 only during a stationary steering operation. Specifically, as illustrated in FIG. 11, the filter section 93 determines whether or not the vehicle is in a state in which a stationary steering operation is performed on the steering mechanism 4 (S10). In the case where the speed of the vehicle is less than a predetermined speed, for example, the filter section 93 determines that a stationary steering operation is performed (S10: YES), and executes the filtering process illustrated in FIG. 8 (S11). In the case where the speed of the vehicle is not less than the predetermined speed, on the other hand, the filter section 93 does not determine that a stationary steering operation is performed (S10: NO), and outputs the basic compensation value Dd computed by the basic compensation value computation section 92 as the output value α (S12). According to such a configuration, abnormal sound from the motor 51 during a stationary steering operation can be effectively reduced.

In the embodiment described above, the filter section 93 executes a process of setting both the preceding output value $α_b$ and the preceding basic compensation value $Dd_b$, which are input values, to zero and a process of setting the output value α from the filter section 93 to zero when the sign of the q-axis current command value Iq* is reversed between positive and negative. However, such processes may be omitted. That is, the processes in S3 and S7 to S9 may be omitted in the filtering process illustrated in FIG. 8.

Figure 6:
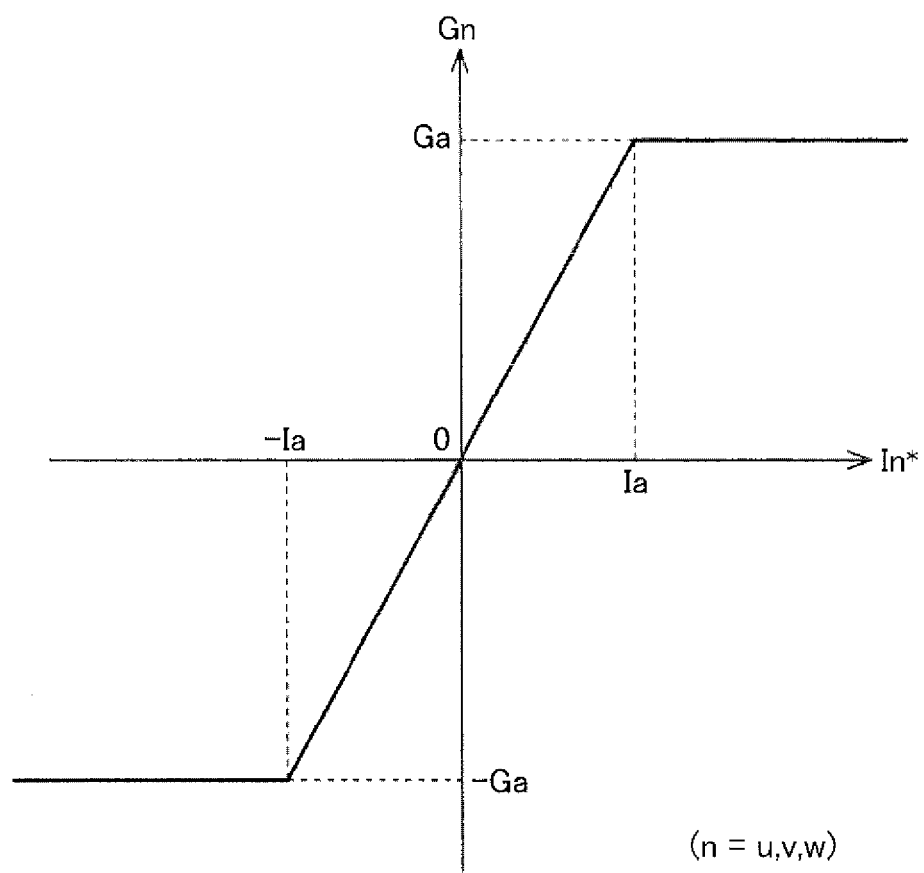
FIG. 6 is a graph illustrating the relationship between a current command value In* and a gain Gn.

In the embodiment described above, the gains Gu, Gv, and Gw for the respective phases are computed on the basis of the map illustrated in FIG. 6. However, computation of the gains Gu, Gv, and Gw is not limited to map computation. For example, the gains Gu, Gv, and Gw for the respective phases may be set to a constant negative value when the current command values Iu*, Iv*, and Iw* for the respective phases are negative values, and the gains Gu, Gv, and Gw for the respective phases may be set to a constant positive value when the current command values Iu*, Iv*, and Iw* for the respective phases are positive values.

In the embodiment described above, the basic compensation value Dd is computed on the basis of the map illustrated in FIG. 7. However, a method of computing the basic compensation value Dd is not limited thereto. For example, in the case where the current command value computation section 80 sets the d-axis current command value Id* to a value other than zero, the basic compensation value Dd may be set on the basis of both the d-axis current command value Id* and the q-axis current command value Iq*. Specifically, the basic compensation value Dd may be set on the basis of the magnitude of a current vector I* obtained from a formula "$I^* = \sqrt{(Id^{*2} + Iq^{*2})}$".

In the embodiment described above, a filtering process in which the formula (1) given above is used is presented as the filtering process corresponding to a low-pass filter performed by the filter section 93. However, another method may be used as appropriate as the filtering process performed by the filter section 93.

The configuration of the motor control device 6 according to the embodiment described above may also be applied to an electric power steering device that applies an assist force from a motor to a rack shaft, for example. In addition, the configuration of the motor control device 6 according to the embodiment described above may also be applied to other motor control devices as appropriate, rather than to a motor control device for an electric power steering device.

What is claimed is:

1. A motor control device comprising:
a drive circuit that supplies drive electric power to a motor;
a current sensor that detects a current value to be supplied to the motor; and
a control section that computes a voltage command value through execution of current feedback control in which the current value detected by the current sensor is caused to follow a current command value, and generates a control signal on the basis of a duty command value corresponding to the voltage command value to control drive of the drive circuit on the basis of the control signal, wherein:

the control section includes a dead time compensation section that corrects the duty command value on the basis of a dead time compensation value;

the dead time compensation section includes:

a basic compensation value computation section that computes a basic compensation value, which is a fundamental value of the dead time compensation value, on the basis of the current command value, and a filter section that performs a filtering process corresponding to a low-pass filter on the basic compensation value;

the dead time compensation section is configured to set the dead time compensation value on the basis of an output value from the filter section, the basic compensation value is a constant value that is greater than zero when an absolute value of the current command value is equal to or more than a threshold value, and the output value is calculated from a current basic compensation value $Dd$, a preceding basic compensation value $Dd_b$, and a preceding output value $\alpha_b$ from the filter section on the basis of the following formula (1), wherein $G0$ indicates a gain from the filter section:

$$\alpha = Dd_b + G0 \times \{Dd - \alpha_b\}. \tag{1}$$

2. The motor control device according to claim 1, wherein:

the control section sets a d-axis current command value and a q-axis current command value in a d/q coordinate system, converts current values for respective phases detected by the current sensor into a d-axis current value and a q-axis current value in the d/q coordinate system using a rotational angle of the motor, and executes current feedback control based on a deviation between the d-axis current value and the d-axis current command value such that the d-axis current value follows the d-axis current command value, and based on a deviation between the q-axis current value and the q-axis current command value such that the q-axis current value follows the q-axis current command value;

the dead time compensation section sets the basic compensation value on the basis of the q-axis current command value, and reverses a sign of the dead time compensation value between positive and negative when a sign of the q-axis current command value is reversed between positive and negative; and the filter section is configured to set an input value and an output value of the filtering process to zero when a sign of the q-axis current value is reversed between positive and negative.

3. An electric power steering device comprising:

a steering mechanism;

a motor that applies an assist force to the steering mechanism; and a motor control device that controls drive of the motor, wherein:

the motor control device according to claim 1 is used as the motor control device; and the filter section is configured to perform a filtering process on the basic compensation value when a stationary steering operation is performed on the steering mechanism.

* * * * *